(12) United States Patent
Chang

(10) Patent No.: US 7,775,680 B2
(45) Date of Patent: Aug. 17, 2010

(54) LED LAMP ASSEMBLY

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/861,309

(22) Filed: Sep. 26, 2007

(65) Prior Publication Data
US 2008/0259609 A1    Oct. 23, 2008

(30) Foreign Application Priority Data
Apr. 20, 2007    (CN)    ................ 2007 1 0200495

(51) Int. Cl.
*F21V 5/00*    (2006.01)
(52) U.S. Cl. ............ 362/244; 362/246; 362/613
(58) Field of Classification Search ............ 362/252, 362/97, 240, 246, 249, 241, 244, 373, 294, 362/236, 573, 249.02, 249.06, 565–566, 362/611–613
See application file for complete search history.

(56) References Cited

U.S. PATENT DOCUMENTS

| | | | | |
|---|---|---|---|---|
| 4,335,421 A * | 6/1982 | Modia et al. | ................ | 362/223 |
| 5,954,423 A | 9/1999 | Logan et al. | | |
| 6,481,870 B2 * | 11/2002 | Son | ............ | 362/259 |
| 7,036,956 B1 * | 5/2006 | Chou | ............ | 362/246 |
| 2004/0218388 A1 * | 11/2004 | Suzuki | ........ | 362/231 |
| 2004/0255497 A1 * | 12/2004 | Venkataraman et al. | ....... | 40/551 |
| 2005/0281050 A1 * | 12/2005 | Chou | ............ | 362/612 |
| 2006/0114690 A1 * | 6/2006 | Iki et al. | ........ | 362/612 |
| 2006/0193148 A1 * | 8/2006 | Bang | .......... | 362/607 |
| 2007/0002590 A1 | 1/2007 | Jiang et al. | | |
| 2007/0041190 A1 * | 2/2007 | Chou | ............ | 362/252 |
| 2007/0165421 A1 * | 7/2007 | Sakai et al. | ........ | 362/612 |

FOREIGN PATENT DOCUMENTS

| | | |
|---|---|---|
| CN | 1199077 C | 4/2005 |
| JP | 10-163527 | 6/1998 |
| TW | I224230 | 11/2004 |
| TW | M309757 | 4/2007 |

\* cited by examiner

*Primary Examiner*—Jong-Suk (James) Lee
*Assistant Examiner*—Julie A Shallenberger
(74) *Attorney, Agent, or Firm*—Frank R. Niranjan

(57) ABSTRACT

An exemplary LED lamp assembly includes a housing (21), a printed circuit board (22), a LED (23), a light reflective member (24) and a lamp cover (25). The housing includes a top cover (211), a base board (213), a plurality of sidewalls (215) connecting with the top cover and the base board, and an opening (218) defined on one of the sidewalls. The printed circuit board is positioned on the base board. The LED is electrically connected to the printed circuit board. The LED includes a light emitting side surface (233) and a top surface (235) adjoining to the light emitting side surface, a portion of the light emitting side surface facing the opening, and the top surface facing the top cover. The light reflective member is located in the housing for reflecting light from the LED and out via the opening. The lamp cover covers the opening.

13 Claims, 8 Drawing Sheets

LED LAMP ASSEMBLY

CROSS-REFERENCE TO RELATED APPLICATIONS

This application is related to one copending U.S. patent application, which is: application Ser. No. 11/861,308, filed on Sep. 26, 2007, entitled "LED LAMP ASSEMBLY", by Shao-Han Chang. The copending application has the same assignee as the present application. The disclosures of the above identified application is incorporated herein by reference.

BACKGROUND OF THE INVENTION

1. Field of the Invention

The present invention relates to a lamp assembly, and more particularly to a light emitting diode lamp assembly employed in a direct type backlight module of a liquid crystal display.

2. Discussion of the Related Art

Typically, light emitting diode (hereinafter called LED) has advantages such as low energy consumption, long service life, and so on. Therefore, LEDs are widely used in lamps.

Typically, FIG. 8 illustrates an LED lamp assembly 10 using LEDs as a light source. The LED lamp assembly 10 includes a housing 11, a printed circuit board 12, a plurality of side-emitting LEDs 13, a light reflective member 14, a plurality of round reflective sheets 15 and a lamp cover 16. The housing 11 is an elongated, hollow structure having an opening 112. The LEDs 13 are arranged apart and electrically connected with the printed circuit board 12. The printed circuit board 12 with the LEDs 13 is disposed on a bottom surface of the housing 11. The light reflective member 14 includes a rectangular bottom reflective plate 144 and four connecting sidewalls 142 extending from a periphery of the bottom reflective plate 144. The bottom reflective plate 144 defines a plurality of through holes 146 according to the LEDs 13, configured for light-emitting portions of the LEDs 13 passing therethrough. The light reflective member 14 can be mounted into the housing 11 via the opening 112. The circular reflective sheets 15 are positioned at the tops of the LEDs 13 respectively. The lamp cover 16 seals the opening 112 of the housing 1. Light rays from the light-emitted portions of the LEDs 13 are substantially reflected at the sidewalls 142 and the bottom reflective plate 144, finally output from the lamp cover 16. With the help of the light reflective member 14, an efficiency of light energy utilization of the LED lamp 10 is increased.

Generally, a space between the LEDs 13 and the lamp cover 16 can be decrease due to the light reflection of the circular reflective sheets 15. However, in order to enhance the uniformity of light exiting from the backlight module 10, there must still be a certain space between the LEDs 13 and the lamp cover 16 so that dark strips caused by reduced intensity of light between adjacent lamps 13 are avoided. Therefore, a volume of the LED lamp assembly 10 is still definitely large.

What is needed, therefore, is an LED lamp assembly which has a small volume.

SUMMARY

An LED lamp assembly includes a housing, a printed circuit board, one or more LEDs, a light reflective member and a lamp cover. The housing includes a top cover, a base board facing the top cover, a plurality of sidewalls connecting with the top cover and the base board, and an opening defined on one of the sidewalls. The printed circuit board is positioned on the base board. The LEDs are electrically connected to the printed circuit board. Each LED includes a light emitting side surface and a top surface adjoining the light emitting side surface, a portion of the light emitting side surface facing the opening, and the top surface facing the top cover. The light reflective member is located in the housing for reflecting light from the LEDs and out via the opening. The lamp cover covers the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present LED lamp assembly. Moreover, in the drawings, like reference numerals designate corresponding parts throughout the several views, and all the views are schematic.

DETAILED DESCRIPTION OF THE PREFERRED EMBODIMENTS

References will now be made to the drawings to describe preferred embodiments of the present LED lamp assembly, in detail.

Figure 1:
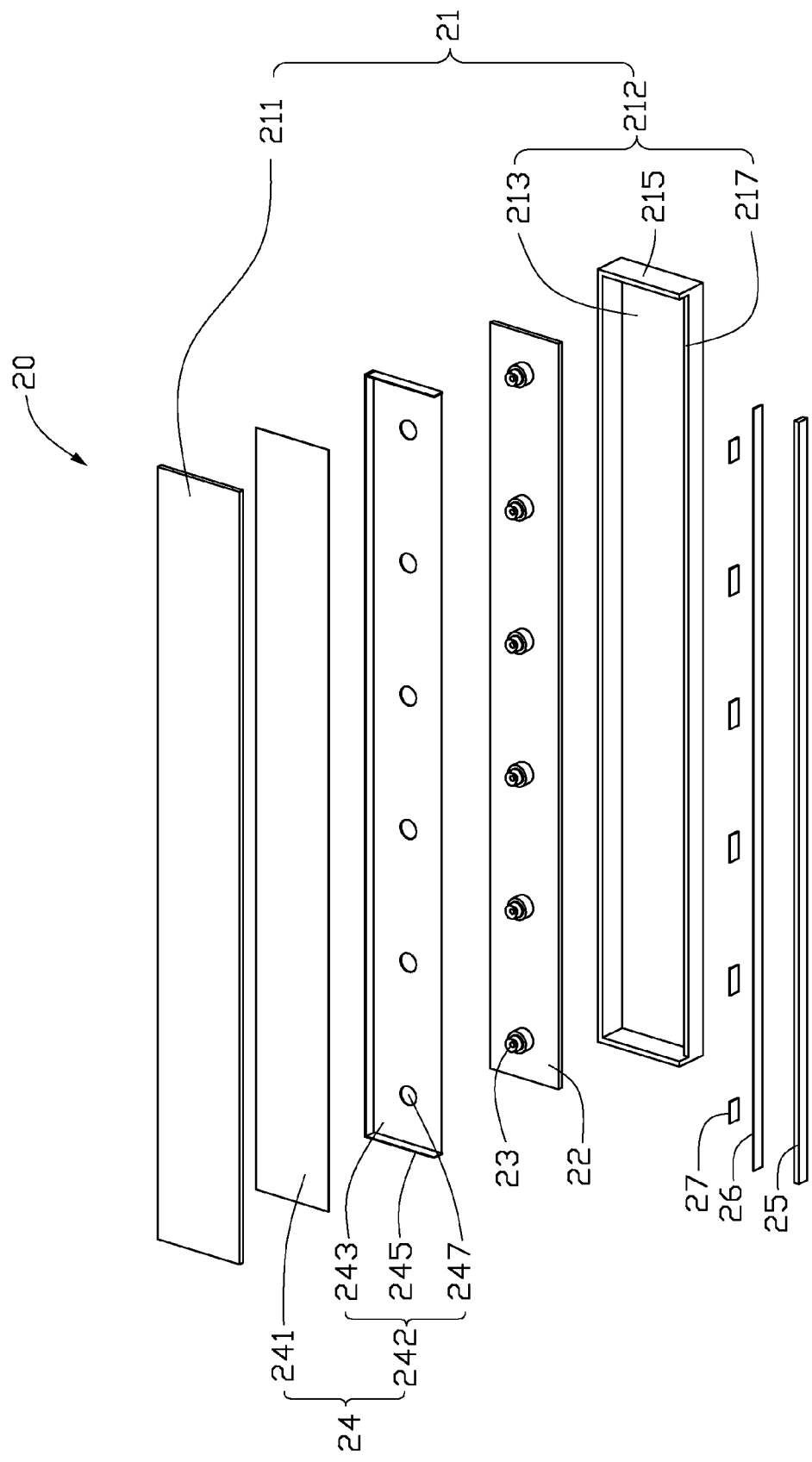
FIG. 1 is an exploded, isometric view of an LED lamp assembly according to a first preferred embodiment of the present invention.
Figure 2:
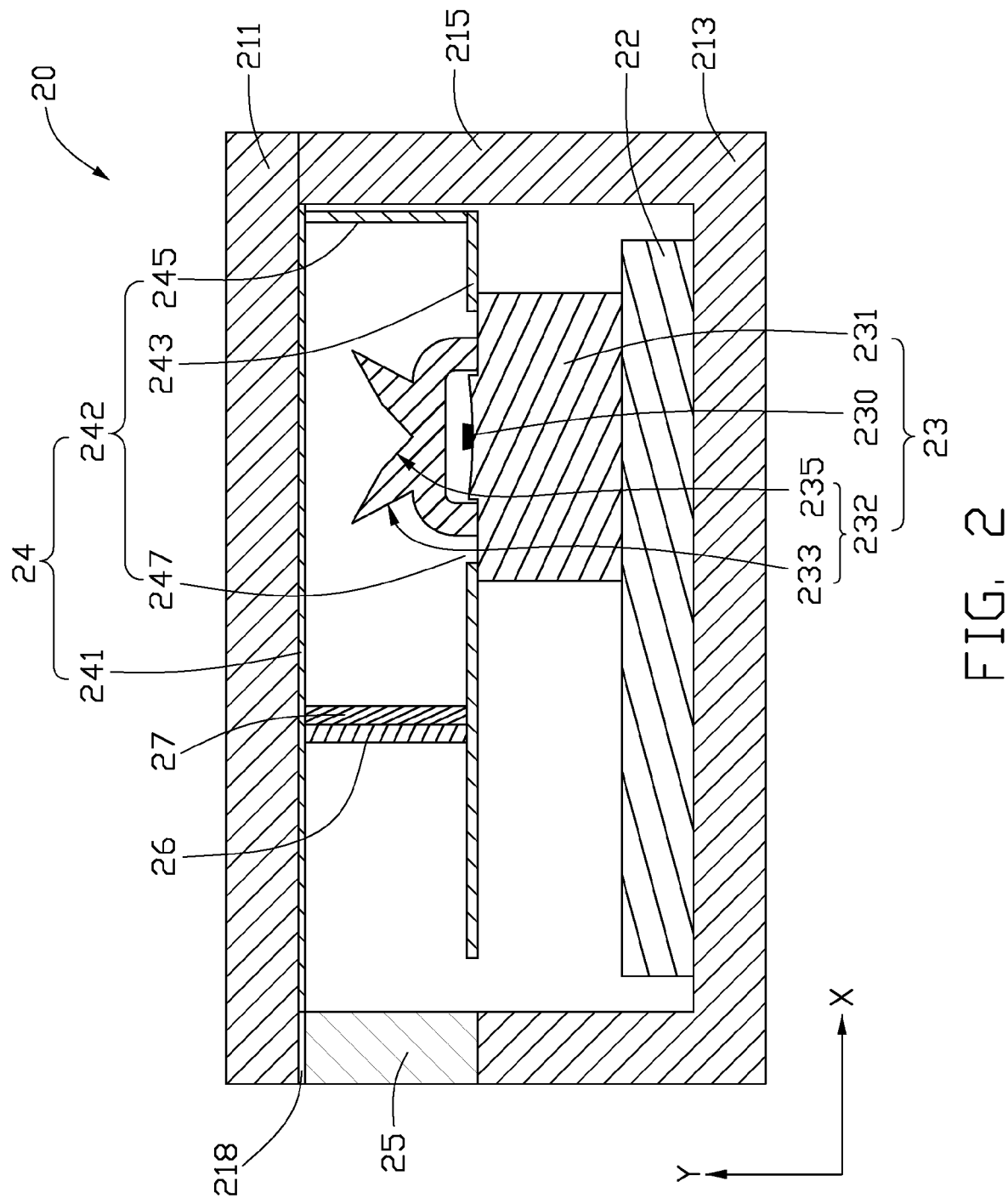
FIG. 2 is an assembled, side, cross-sectional view of the LED lamp assembly of FIG. 1.

Referring to FIGS. 1 and 2, an LED lamp assembly 20 in accordance with a first preferred embodiment of the present invention is shown. The LED assembly 20 includes a housing 21, a printed circuit board 22, a plurality of side-emitting LEDs 23, a light reflective member 24, and a lamp cover 25.

The housing 21 has an elongated, hollow structure, which includes a top cover 211, and a receiving box 212. The receiving box 212 has a base sheet 213 facing the top cover 211, three first sidewalls 215, and a second sidewall 217. The first sidewalls 215 and the second sidewall 217 extend from a periphery of the base 213. A height of the second sidewalls 217 is smaller than a height of the first sidewall 215. therefore the top cover 211 and the receiving box 212 cooperatively define an opening 218 between a top of the second sidewall 217 and an edge of the top cover 211.

The printed circuit board 22 is positioned on the base board 213. Each LED 23 includes a base portion 231 fixed to the printed circuit board 22, a semiconductor chip 230 fixed on the base portion 231, and an optical lens 232 mounted onto the base portion 231. The base portion 231 and the optical lens 232 cooperatively surround the semiconductor chip 230 completely. The optical lens 232 has a light emitting side surface 233 and a top surface 235 adjoining the light emitting side surface 233. A portion of the light emitting side surface 233 faces the opening 218, and the top surface 235 faces the top cover 211.

The light reflective member 24 is utilized for reflecting light generated by the LEDs 23 out of the LED lamp assembly 20 via the opening 218. The light reflective member 24 can be made of either metal materials or plastic materials. In the illustration embodiment, the light reflective member 24 includes a top reflective plate 241 and a reflective box 242. The reflective box 242 has a bottom reflective plate 243 facing the top reflective plate 241, three side reflective plates 245 extending from a periphery of the bottom reflective plate 243, and a plurality of through holes 247 defined in the bottom reflective plate 243. The top reflective plate 241 adjoins the top cover 211. The bottom reflective plate 243 is adjacent to the printed circuit board 22. The three side reflective plates 245 adjoin the three first sidewalls 215 respectively. The optical lens 232 passes through the through hole 247. The base portions 231 of the LEDs 23 support the bottom reflective plate 243 of the light reflective member 24. In alternative embodiments, the bottom reflective plate 243 can be disposed on the printed circuit board 22 with the LEDs 23 passing entirely through the through holes 247.

The lamp cover 25 covers the opening 218 of the housing 21. The lamp cover 25 can be either a light diffusion plate or transparent plate.

In an alternative embodiment, to improve a uniformity of light exiting from the backlight module 20, the LED lamp assembly 20 further includes a transparent sheet 26 and a plurality of light shielding members 27 corresponding to the LEDs 23. The transparent sheet 26 is substantially an elongated sheet. The transparent sheet 26 is disposed in the housing 21 between the LEDs 23 and the opening 218. Each light shielding members 27 is substantially a rectangular reflective sheet. The light shielding members 27 can be made of either metal materials or plastic materials. The light shielding members 27 are attached to the transparent sheet 26, and face the LEDs 23 one by one. It is to be understood that, the light shielding members 27 can either be attached to an inner surface of the lamp cover 25, or be configured on the light emitting side surfaces 233 of the LEDs 23 in such manner that a center of each light shielding member 27 substantially aligns with a middle portion of the light emitting side surface 233 of one corresponding LED 23.

In the LED lamp assembly 20, the portion of the light-emitting side surface 233 faces the opening 218, and the top surface 235 faces the top cover 211. Therefore an occupying space in length parallel to X-axis of the housing 21 can be utilized fully, and the occupying space in height parallel to Y-axis of the housing 21 can be reduced. Thus the LED lamp assembly 20 can have a small volume due to the reducing occupying space in height parallel to Y-axis, while also preventing dark strips on the lamp cover 25 caused by reduced intensity of light between the adjacent LEDs 23 because of the full use of the occupying space in height parallel to Y-axis.

To further enhance the uniformity of light exiting from the backlight module, each light shielding member can define a plurality of light holes in two ends of each light shielding member. Each of the light holes is circular, polygonal or elongated. Referring to FIGS. 3 through 7, the light shielding members of the LED lamp assemblies in accordance with a second to sixth preferred embodiment of the present invention is shown respectively.

Figure 3:
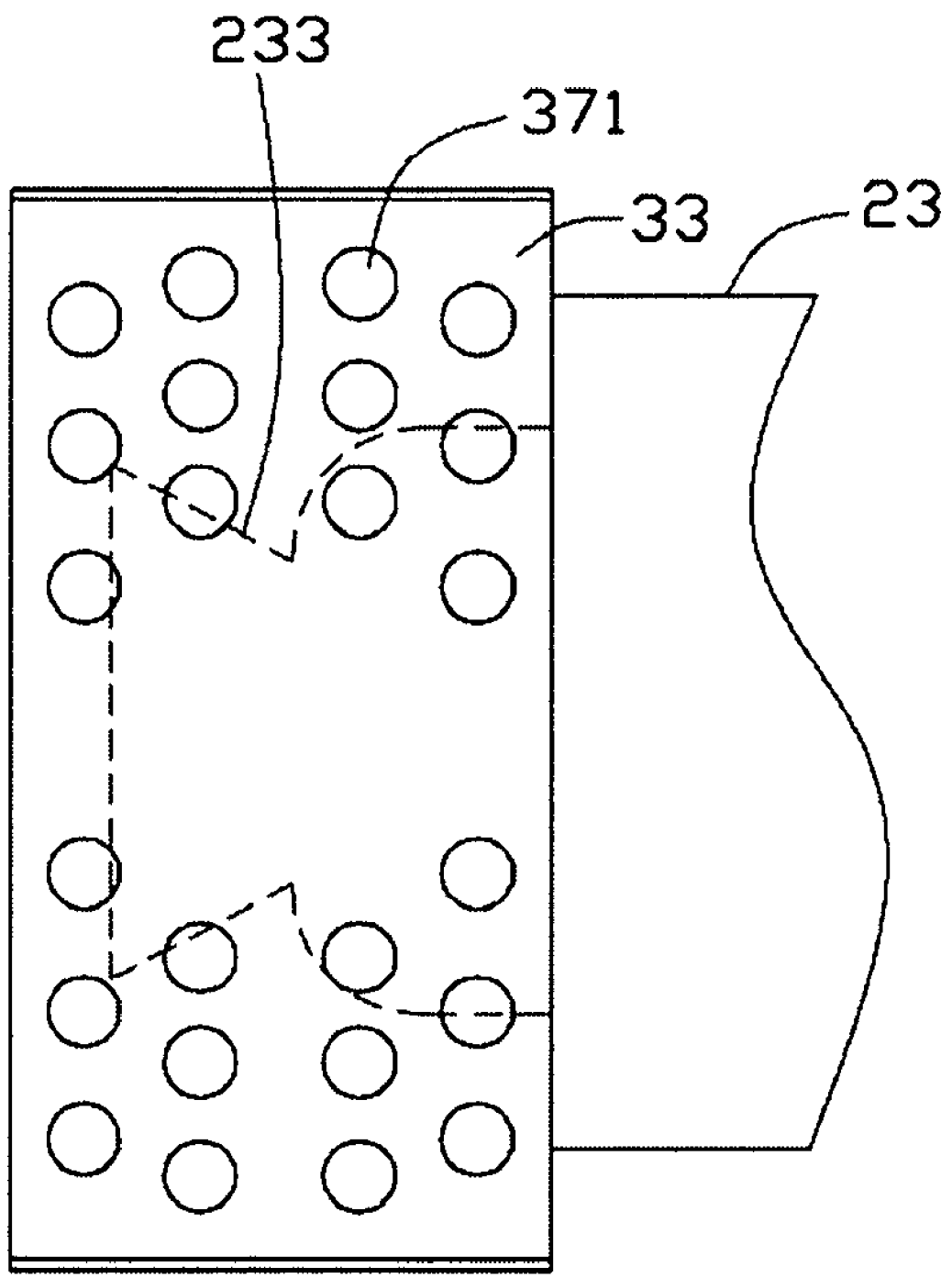
FIGS. 3 to 7 are top plan views of distributions of light holes defined in light-shielding members of LED lamp assemblies according to a second through sixth preferred embodiment of the present invention.
Figure 4:
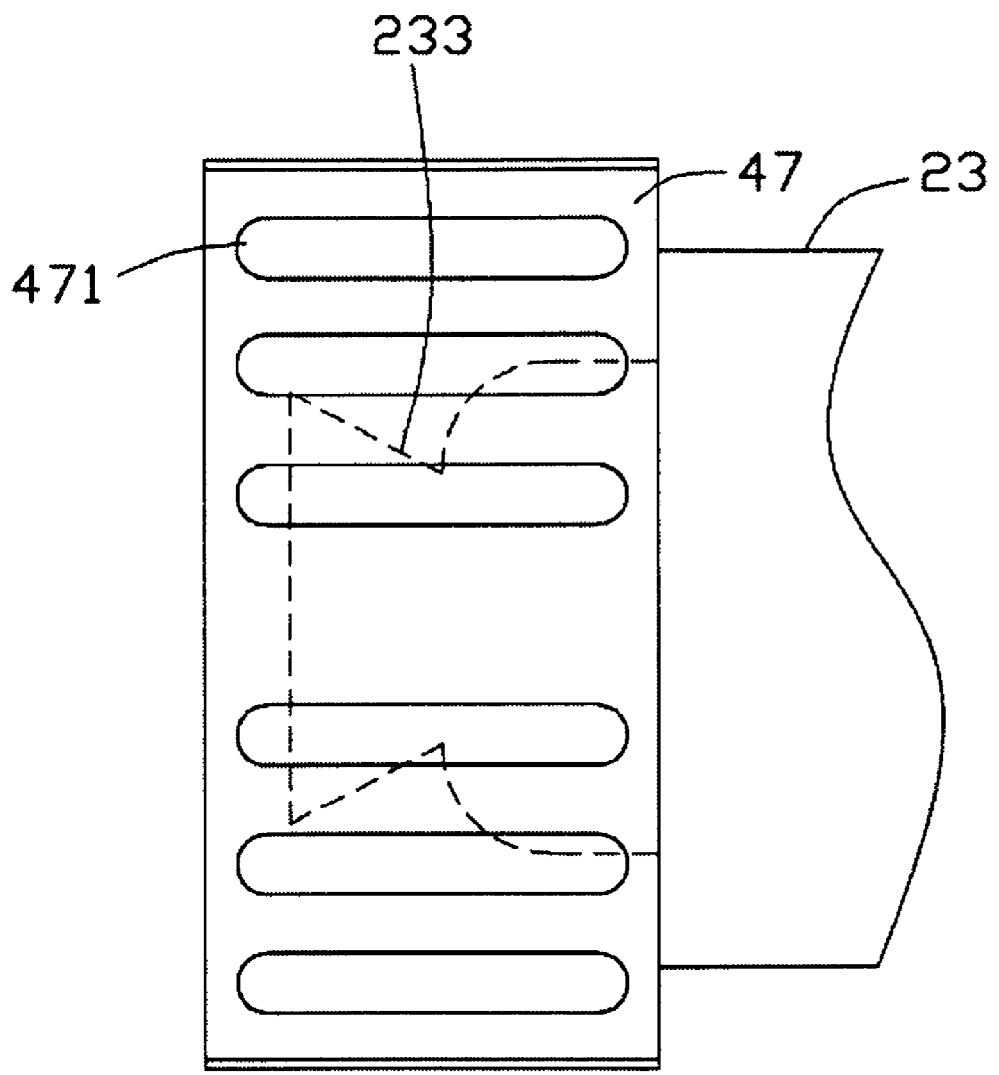
Figure 5:
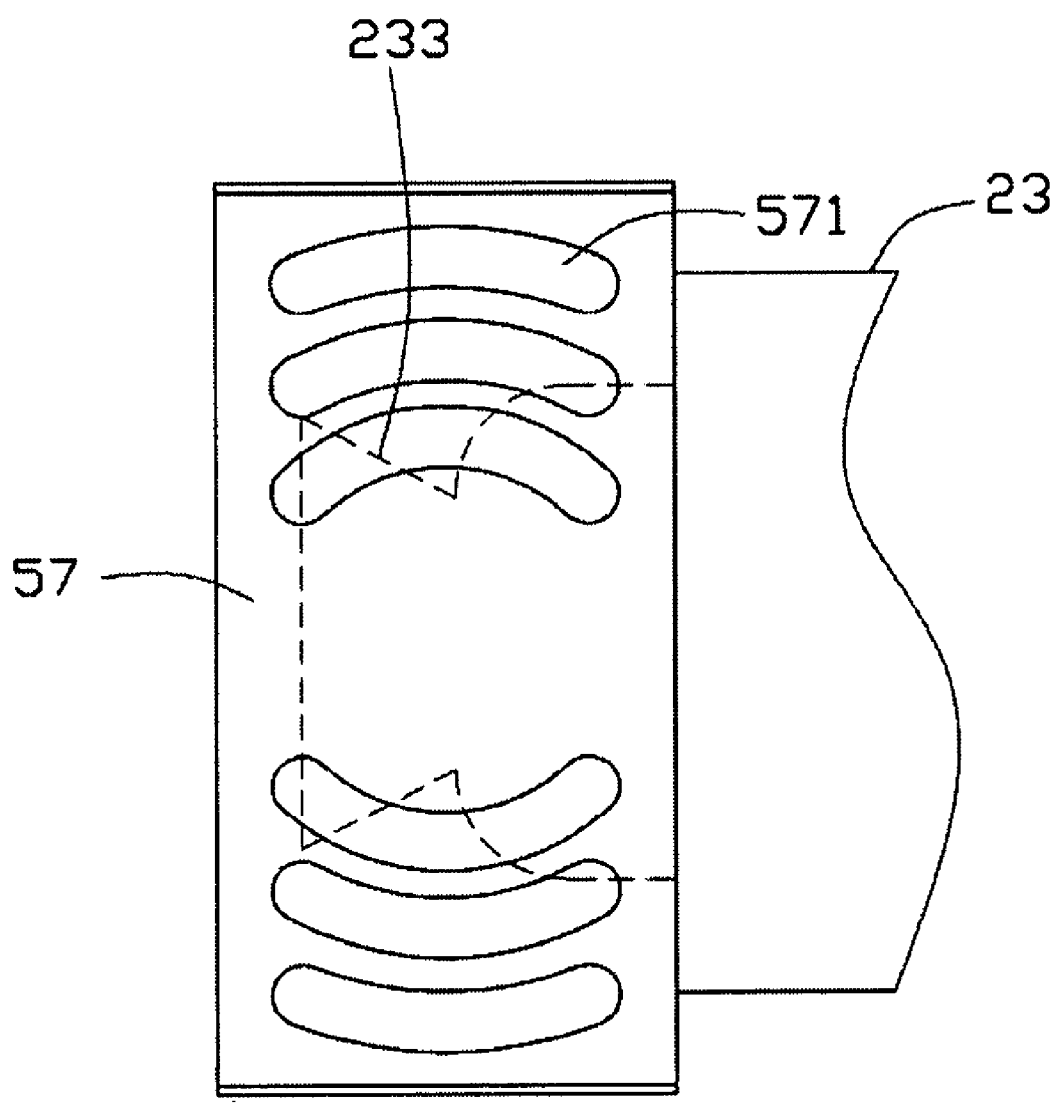

As shown in FIG. 3, a shape of each light hole 371 of a light shielding member 37 is circular, and sizes of horizontal cross section of the light holes 371 are the same. As shown in FIG. 4, a shape of each light hole 471 of a light shielding member 47 is elongated, and sizes of horizontal cross section of the light holes 471 are the same. As shown in FIG. 5, a shape of each light hole 571 of a light shielding member 57 has a crescent shape, and sizes of horizontal cross section of the light holes 571 are the same. In addition, the light holes 371, 471 and 571 are through holes and symmetric along an axis at a center of the light shielding member 37, 47 and 57 respectively. The light shielding members 37, 47 and 57 may be used in the LED lamp assembly 20 in such manner that the center of each light shielding member 37, 47 and 57 substantially aligns with a middle portion of the light emitting side surface 233 of one corresponding LED 23.

Figure 6:
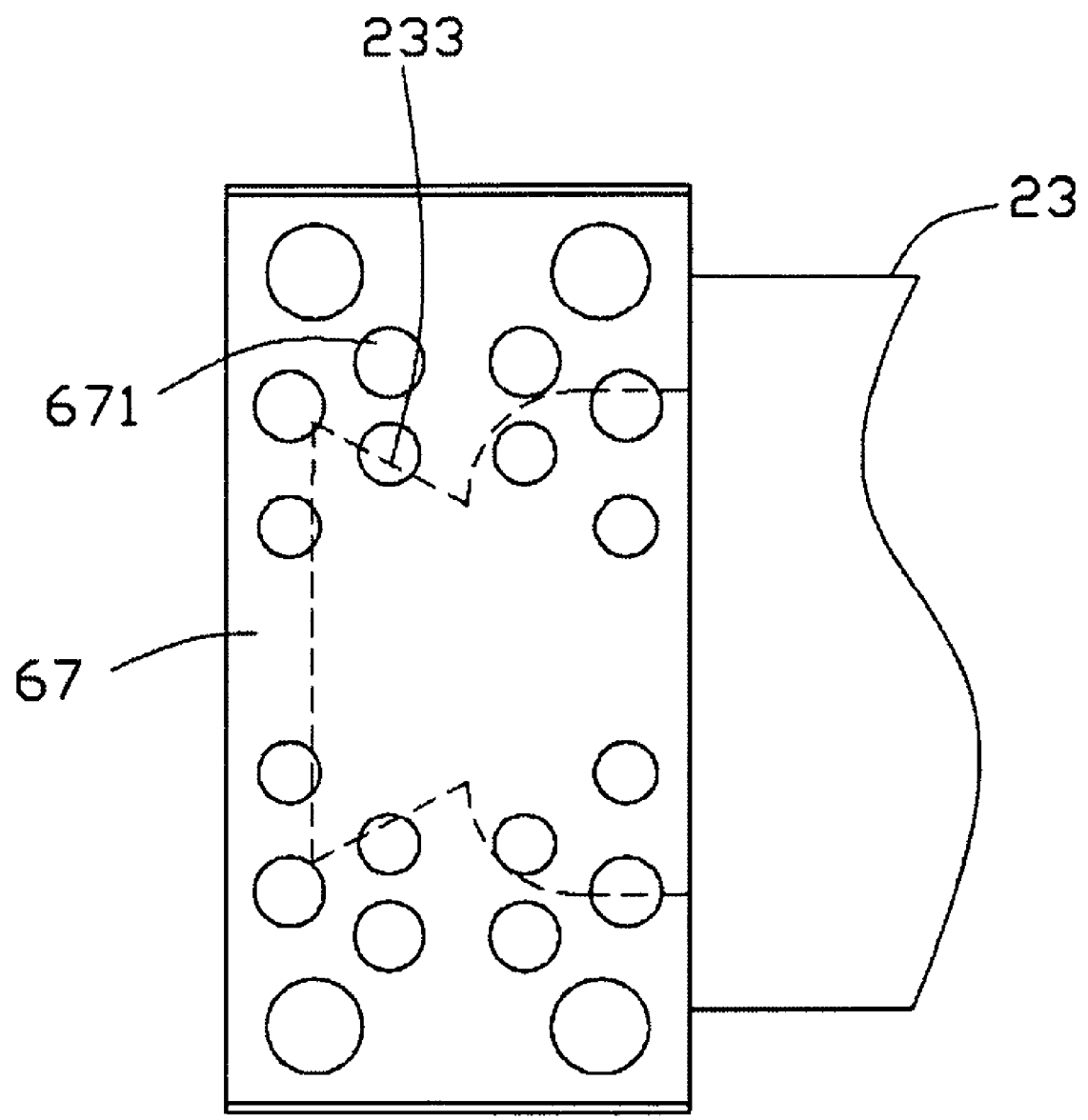
Figure 7:
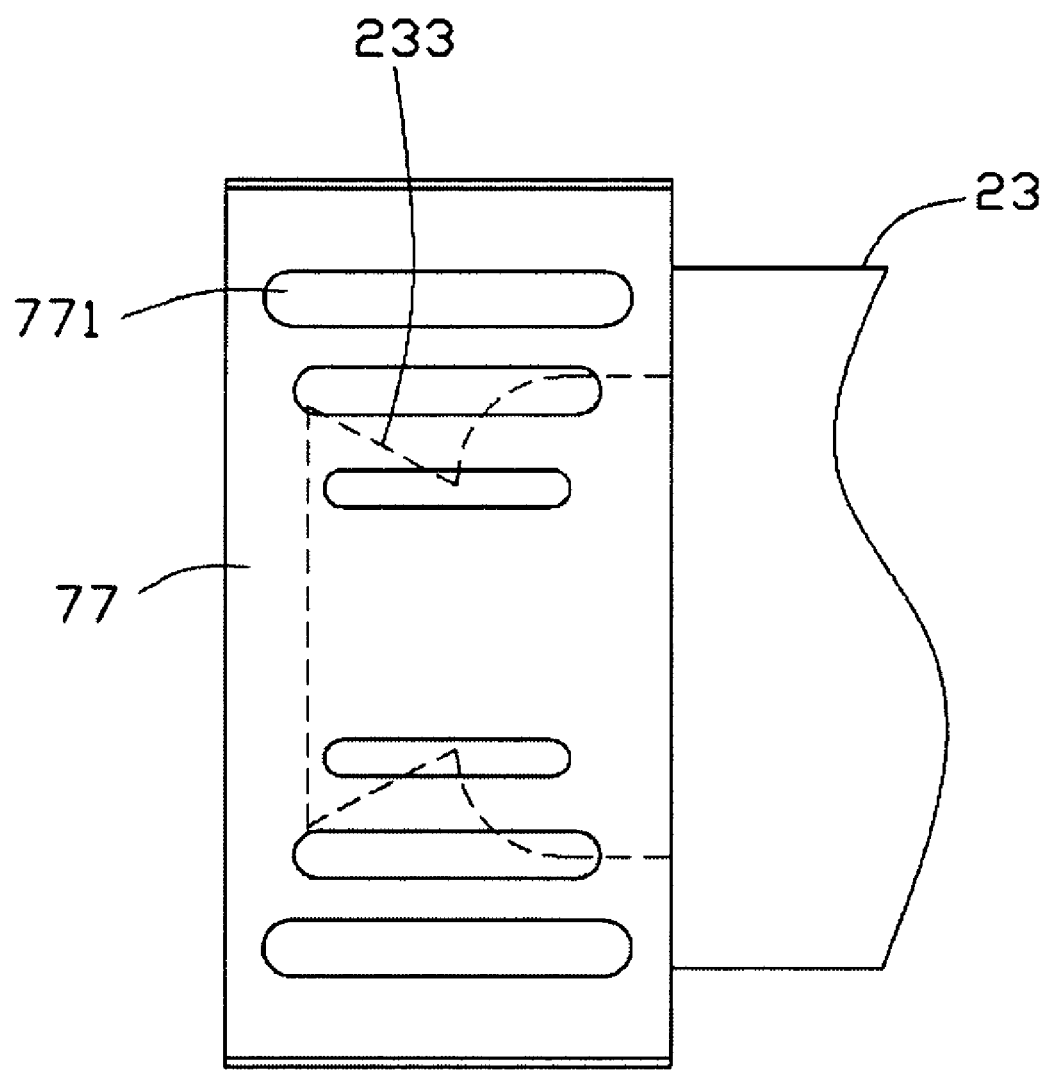
Figure 8:
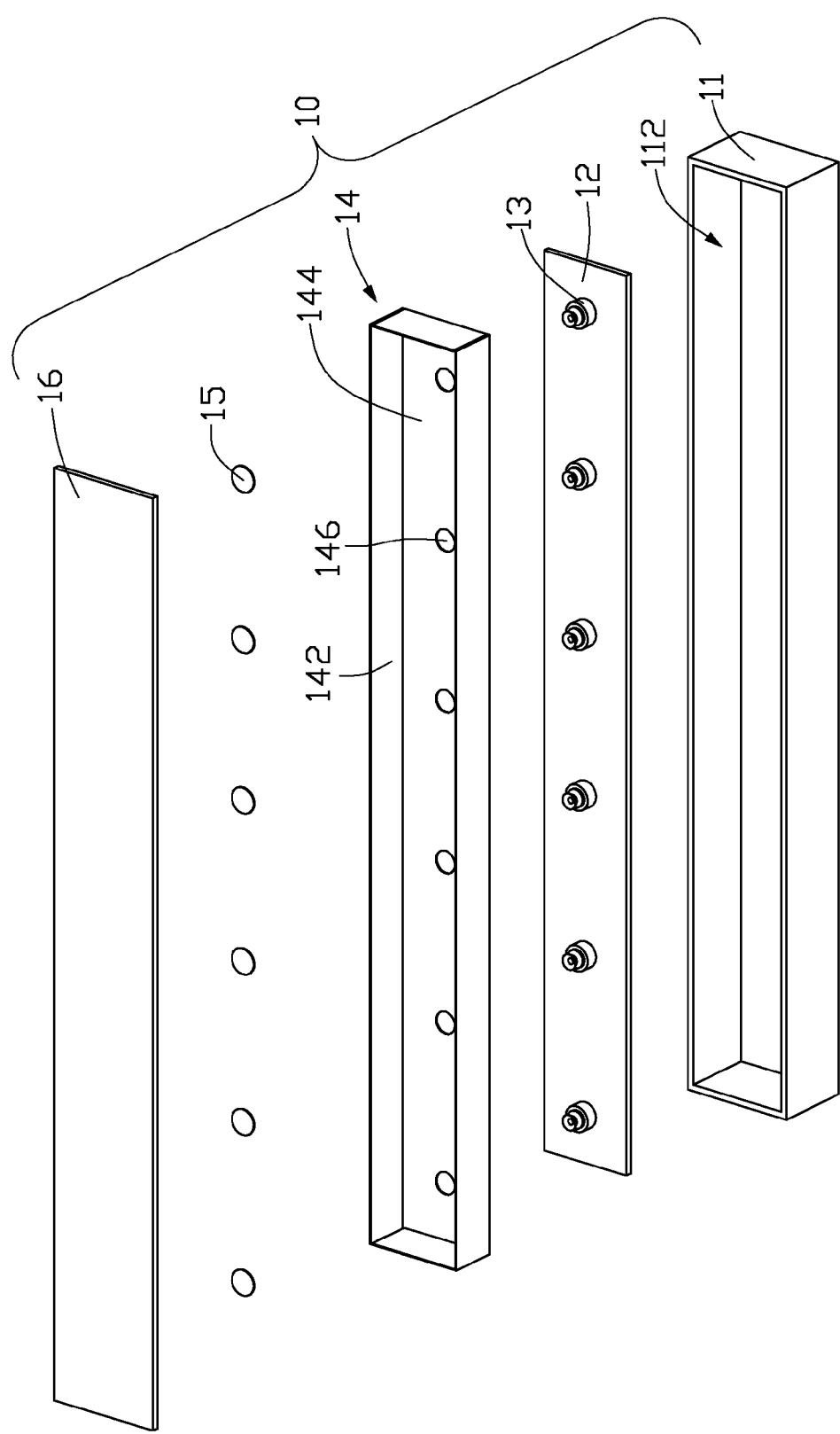
FIG. 8 is an exploded, isometric view of a conventional LED lamp assembly.

As shown in FIG. 6, a size of horizontal cross section of each light hole 671 progressively increases along a direction away from the center of the light-shielding sheet 67. As shown in FIG. 7, a size of horizontal cross section of each light hole 771 progressively increases along a direction away from the center of the light-shielding sheet 77. Similarly, the light shielding members 77 may be used in the LED lamp assembly 20 in such manner that the center of each light shielding member 77 substantially aligns with a middle portion of the light emitting side surface 233 of one corresponding LED 23.

It is noted that the scope of the present the LED lamp assembly is not limited to the embodiments described above. For example, in the LED lamp assembly 20, the lamp cover 25 can be a transparent plate. The light reflective member 24 can be a reflective coating forming on top cover 211, sidewalls 215 and printed circuit board 22.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A light emitting diode (LED) lamp assembly comprising:
    a housing having a base board, a top cover facing the base board, a plurality of sidewalls connecting with the top cover and the base board, and an opening defined in one of the sidewalls;
    a printed circuit board positioned on the base board;
    at least one LED fixed on the printed circuit board and electrically connecting with the printed circuit board, each LED comprising a light emitting side surface and an inverted conical top surface adjoining to the light emitting side surface, a portion of the light emitting side surface facing the opening, and the top surface facing the top cover;
    at least one light shielding member corresponding to the at least one LED and located between the at least one LED and the opening; wherein the at least one light shielding member defines a plurality of through light holes in two ends thereof, a size of a horizontal cross-section of each of the light holes progressively increases along a direction away from a center of the at least one light-shielding member, and the center of the at least one light-shielding member substantially aligns with a middle portion of the light emitting side surface of the at least one LED;
    a light reflective member located in the housing for reflecting light from the at least one LED and out via the opening; and
    a lamp cover covering the opening.

2. The LED lamp assembly according to claim 1, wherein the light reflective member comprises a bottom reflective plate, the bottom reflective plate defining at least one through hole, the at least one LED passing through the at least one through hole correspondingly.

3. The LED lamp assembly according to claim 2, wherein the bottom reflective plate is positioned on the printed circuit board.

4. The LED lamp assembly according to claim 2, wherein each LED comprises a base portion in contact with the printed circuit board, the base portion supporting the bottom reflective plate.

5. The LED lamp assembly according to claim 1, wherein the light reflective member is made of metal materials or plastic materials.

6. The LED lamp assembly according to claim 1, wherein the light reflective member is a reflective coating.

7. The LED lamp assembly according to claim 1, wherein the lamp cover is a transparent plate or a light diffusion plate.

8. The LED lamp assembly according to claim 1, wherein the LED lamp assembly further comprises a transparent sheet, the at least one light shielding member attached to the transparent sheet facing the at least one LED.

9. The LED lamp assembly according to claim 1, wherein the at least one light shielding member is attached to an inner surface of the lamp cover.

10. The LED lamp assembly according to claim 1, wherein the at least one light shielding member is configured on the light emitting side surface of the at least one LED respectively.

11. The LED lamp assembly according to claim 1, wherein a shape of each light hole is circular, polygonal or elongated.

12. The LED lamp assembly according to claim 1, wherein the plurality of light holes are symmetric about a center of the at least one light shielding member.

13. A light emitting diode (LED) lamp assembly comprising:
- a housing having a base board, a top cover facing the base board, a plurality of sidewalls connecting with the top cover and the base board, and an opening defined in one of the sidewalls;
- a printed circuit board positioned on the base board;
- at least one LED fixed on the printed circuit board and electrically connecting with the printed circuit board, each LED comprising a light emitting side surface and an inverted conical top surface adjoining to the light emitting side surface, a portion of the light emitting side surface facing the opening, and the top surface facing the top cover;
- a light reflective member located in the housing for reflecting light from the at least one LED and out via the opening; and
- a lamp cover covering the opening.

* * * * *